United States Patent
Tarlow

(10) Patent No.: US 9,791,698 B2
(45) Date of Patent: Oct. 17, 2017

(54) APPARATUS FOR PROVIDING A HEADS UP DISPLAY USING A DISPLAY OUTPUT OF A MOBILE DEVICE

(71) Applicant: Maier J. Tarlow, Brooklyn, NY (US)

(72) Inventor: Maier J. Tarlow, Brooklyn, NY (US)

( * ) Notice: Subject to any disclaimer, the term of this patent is extended or adjusted under 35 U.S.C. 154(b) by 0 days.

(21) Appl. No.: 15/076,339

(22) Filed: Mar. 21, 2016

(65) Prior Publication Data

US 2016/0274359 A1    Sep. 22, 2016

Related U.S. Application Data

(60) Provisional application No. 62/135,356, filed on Mar. 19, 2015.

(51) Int. Cl.
*G02B 27/14*    (2006.01)
*G02B 5/08*     (2006.01)
*G02B 27/01*    (2006.01)

(52) U.S. Cl.
CPC ..... *G02B 27/0149* (2013.01); *G02B 27/0101* (2013.01); *G02B 2027/013* (2013.01); *G02B 2027/0161* (2013.01); *G02B 2027/0169* (2013.01)

(58) Field of Classification Search
USPC .................. 359/630–639, 838–884
See application file for complete search history.

(56) References Cited

U.S. PATENT DOCUMENTS

| | | | | |
|---|---|---|---|---|
| 5,589,979 | A * | 12/1996 | Martin | G03B 21/00 |
| | | | | 353/122 |
| 2002/0135911 | A1* | 9/2002 | Glasow | B60N 2/4876 |
| | | | | 359/880 |
| 2003/0026010 | A1 | 2/2003 | Kho et al. | |
| 2004/0186632 | A1 | 9/2004 | Arai | |
| 2006/0022896 | A1 | 2/2006 | Kumon et al. | |
| 2006/0168864 | A1* | 8/2006 | Chan | A45D 42/18 |
| | | | | 40/733 |
| 2007/0233376 | A1 | 10/2007 | Gershony et al. | |

OTHER PUBLICATIONS

International Search Report and Written Opinion, dated May 26, 2016, from corresponding International Application No. PCT/US2016/023455, filed Mar. 21, 2016.

* cited by examiner

*Primary Examiner* — Mohammed Hasan
(74) *Attorney, Agent, or Firm* — Norton Rose Fulbright US LLP; Aaron Grunberger

(57) ABSTRACT

An apparatus includes a device including a screen; a ledge against which the device lays; a connecting arm; and a partially transparent mirror coupled to the ledge via the connecting arm, where the mirror includes a center and two outer lateral edges and is structured and arranged relative to the ledge such that the screen faces the mirror and a center of the mirror is further from the screen than each of the two outer lateral edges, a part of the mirror that is adjacent the first of the two outer lateral edges thereby reflecting a part of the screen that is opposite the second of the two outer lateral edges, and a part of the mirror that is opposite the second of the two outer lateral edges thereby reflecting a part of the screen that is opposite the first of the two outer lateral edges.

17 Claims, 4 Drawing Sheets

APPARATUS FOR PROVIDING A HEADS UP DISPLAY USING A DISPLAY OUTPUT OF A MOBILE DEVICE

CROSS-REFERENCE TO RELATED APPLICATION

The present invention claims the benefit, under 35 U.S.C. §119(e), of U.S. Prov. Pat. App. Ser. No. 62/135,356, filed Mar. 19, 2015, the entire contents of which is hereby incorporated by reference in its entirety.

FIELD OF THE INVENTION

The present invention relates to a heads up display device.

DETAILED DESCRIPTION

Figure 1:
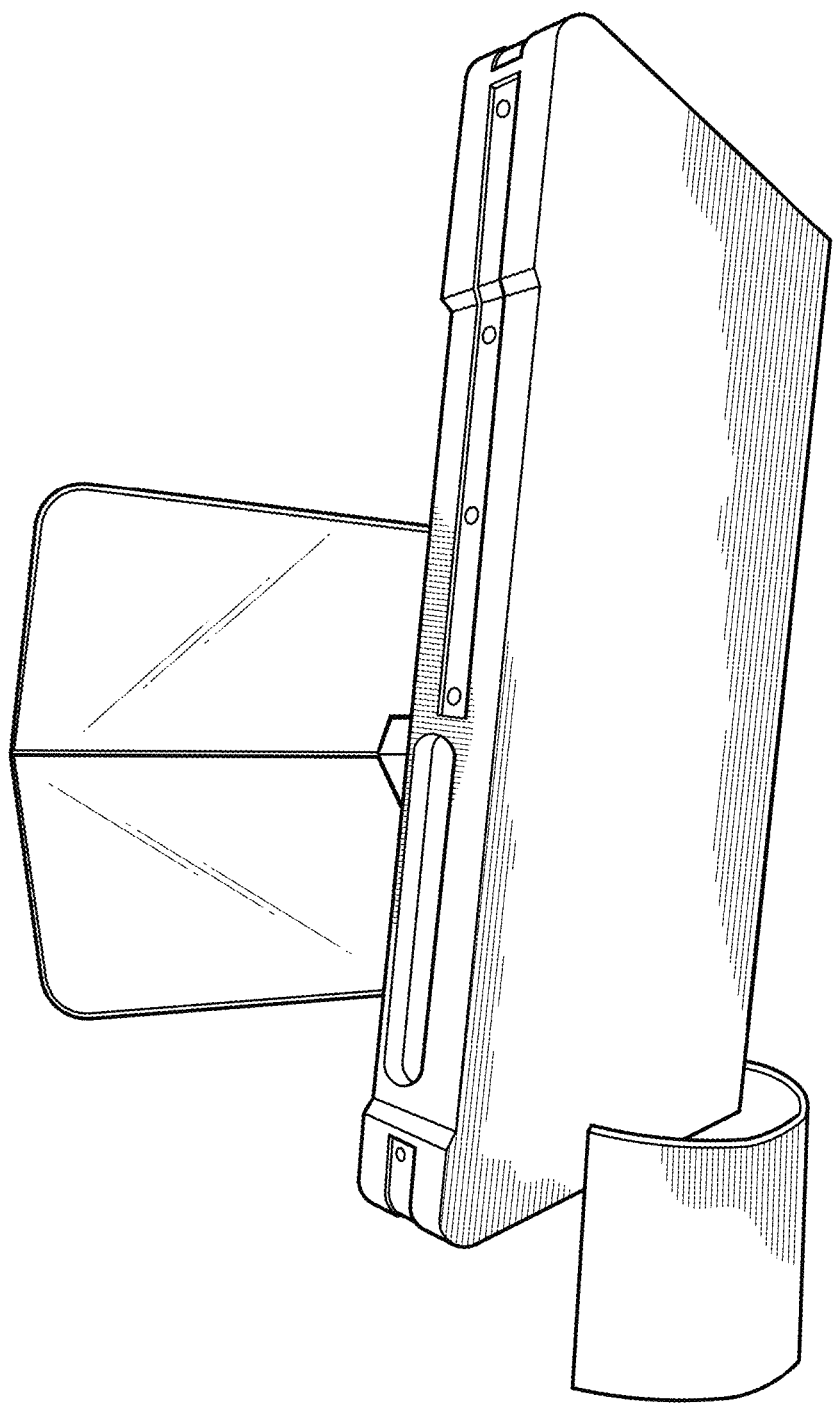
FIG. 1 shows an apparatus fastened to a mobile device according to an example embodiment of the present invention.
Figure 2:
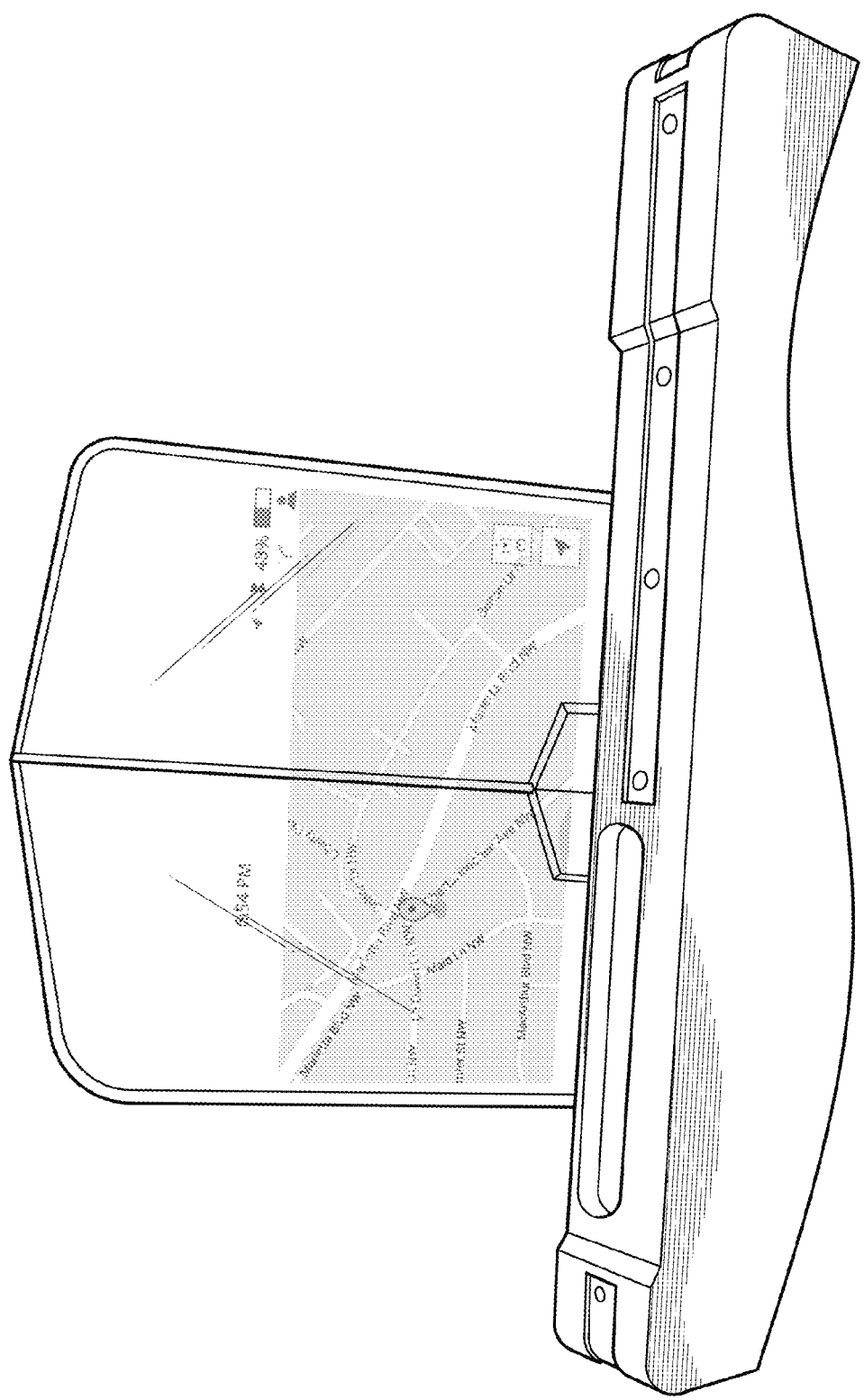
FIG. 2 shows an apparatus with a partial mirror reflecting a surface of a mobile device according to an example embodiment of the present invention.
Figure 3:
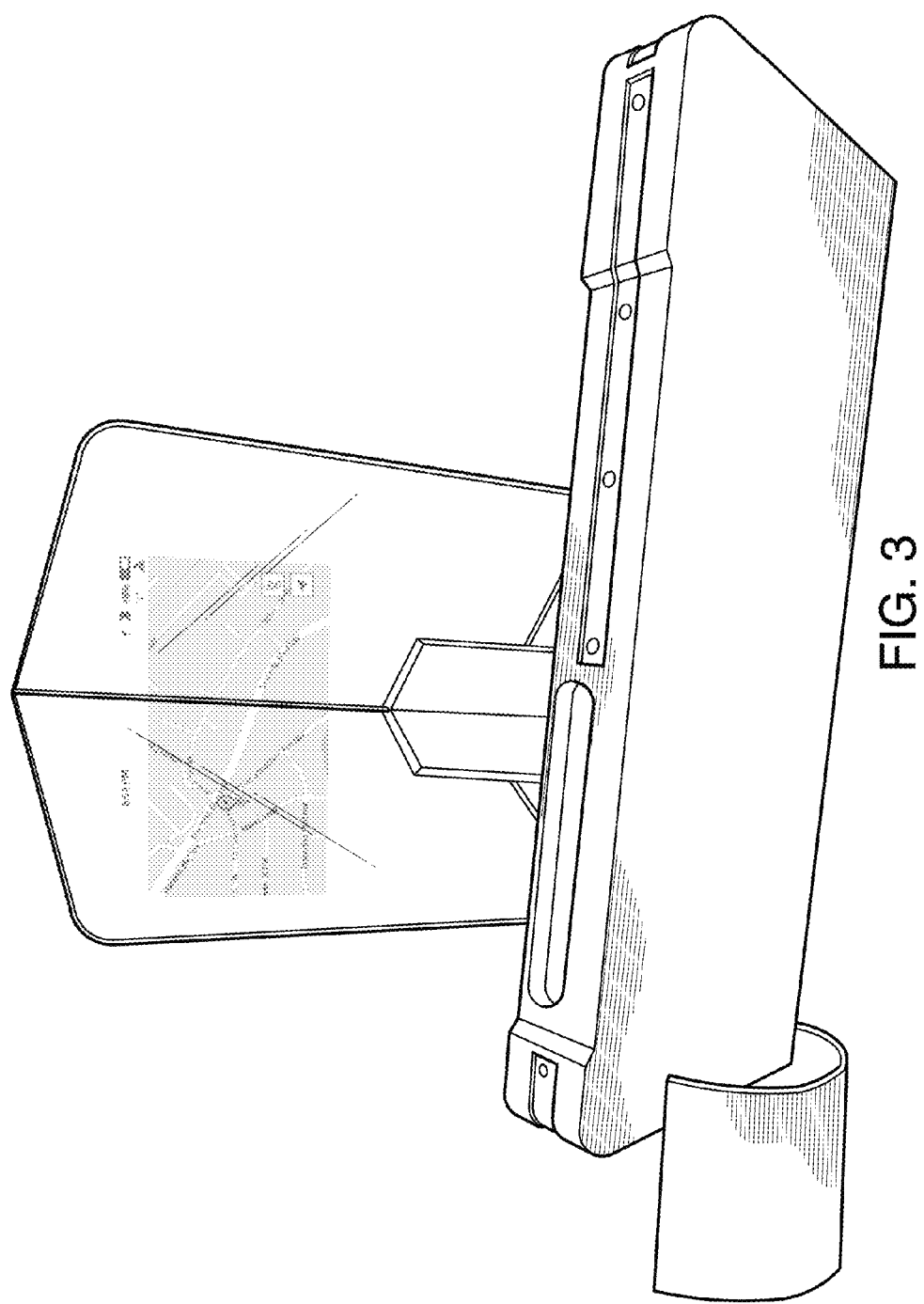
FIGS. 3 and 4 show the apparatus of FIG. 2 from different perspectives.

An apparatus includes a housing with a receiving section adapted for releasably holding a mobile device, such as a mobile telephone device or other mobile computing device. For example, FIGS. 1-4 show a mobile telephone 1, and FIGS. 1 and 3 show a receiving section 2 in which the mobile telephone 1 is being held.

In an example embodiment, the receiving section 2 is flexible so that mobile devices of various sizes can each be fastened in the receiving section. For example, in an example embodiment, the receiving section 2 includes a fixed section and a movable section that can be moved in a direction away from and in a direction towards the fixed section, with a biasing mechanism, such as a spring, that biases the movable section in the direction towards the fixed section. In this embodiment, a user can apply force to the movable section, to move it in the direction away from the fixed section against the biasing force, to thereby provide a large enough space in which to insert the mobile device, and thereafter release the movable section so that the biasing force pulls the movable section towards the fixed section with the mobile device positioned between the fixed and movable sections, the biasing force thereby firmly holding the mobile device to the apparatus.

In other example embodiments, other fixing means are provided for releasably fastening the mobile device to the apparatus.

The apparatus further includes a partial mirror 3, including a semi-reflective surface with a transparency that allows for observing an environment at a first side of the partial mirror from a second opposite side of the partial mirror.

Figure 4:
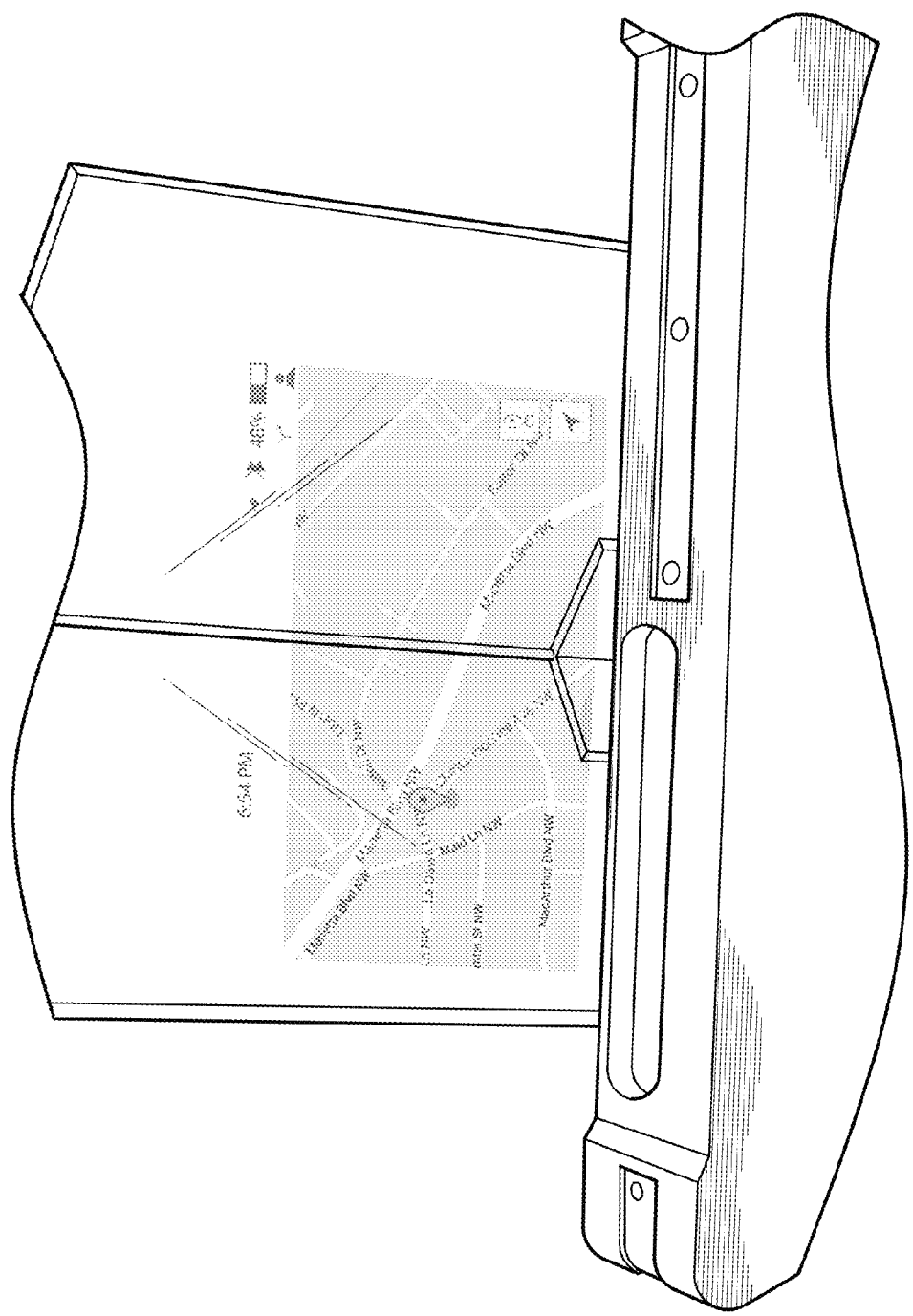

The partial mirror is attached to the housing, positioned relative to the receiving section such that, when a mobile device 1 is fastened in the receiving section 2, a surface of the mobile device 1 is reflected by the partial mirror 3. For example, FIGS. 2-4 show the partial mirror 3 reflecting a map display 4 of the mobile device 1. Further, the housing and partial mirror 3 are arranged such that the mobile device 1 can be fastened in the receiving section 2 with a screen of the mobile device 1 being the surface that is reflected by the partial mirror 3.

In an example embodiment, the apparatus is configured for the mobile device 1, when fastened to the apparatus, to be tilted so that an upper end 5 of the reflected surface is further from the partial mirror 3 than a lower end 6 of the reflected surface.

In an example embodiment, the apparatus is configured for the mobile device 1, when fastened to the apparatus, to be positioned relative to the partial mirror 3 such that a top 7 of the partial mirror 3 is higher than a top 5 of the reflected surface, so that the partial mirror 3 can be viewed over the top 5 of the mobile device 1.

In an example embodiment, the apparatus includes a fastening component by which the apparatus is releasable fastenable to a vehicle dashboard and/or a vehicle windshield, such that, when the apparatus is fastened to the dashboard and/or windshield, a driver can view, through the partial mirror 3, an environment behind the partial mirror 3 and beyond the windshield while the partial mirror 3 also reflects the screen of the mobile device 1 releasably fastened within the receiving section 2 of the apparatus.

In an example embodiment, the partial mirror 3 is a true mirror, such that the reflection of the screen by the mirror 3 is not a reverse of an actual display within the screen of the mobile device 1.

In an example embodiment, the true mirror is a curved mirror.

In an alternative example embodiment, the true mirror is formed of at least two mirrors 3a and 3b positioned at an angle to each other. For example, in an example embodiment, the true mirror is formed of two abutting mirrors 3a and 3b arranged relative to each other at an angle selected from a range of approximately 45°-90°. For example, in an example embodiment, the true mirror is formed of two abutting mirrors 3a and 3b arranged relative to each other at an angle of approximately 45°.

According to an example embodiment, a system includes a mobile device 1 as described above and an apparatus in which the mobile device 1 is held, the apparatus including a partial mirror 3 as described above positioned relative to a display screen of the mobile device 1, according to a relative position as described above, such that a true non-reversed image of the display screen is reflected by the partial mirror 3 while an environment beyond the partial mirror 3, on a side of the partial mirror 3 opposite the side that faces the display screen, is viewable through the partial mirror 3.

According to an example embodiment, a vehicle includes a system as described above.

The above description is intended to be illustrative, and not restrictive. Those skilled in the art can appreciate from the foregoing description and the following drawings that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and the following claims.

What is claimed is:

1. An apparatus comprising:
   a ledge;
   a connecting arm; and a partial mirror that:
   is coupled to the ledge via the connecting arm;
   is partially transparent;
   includes a center, a first outer lateral edge, and a second outer lateral edges;
   is structured and arranged relative to the ledge such that, if a component having a flat surface is laid against the ledge with the flat surface facing away from the ledge and spanning laterally from across the first outer lateral edge to across the second outer lateral edge, the flat surface faces the partial mirror and a center of the partial mirror is further from the flat surface than each of the first and second outer lateral edges, a part of the partial mirror that is adjacent the first outer lateral edge thereby reflecting a part of the flat surface that is opposite the second outer lateral edge, and a part of the partial minor that is opposite the second outer lateral edge thereby reflecting a part of the flat surface that is opposite the first outer lateral edge; and
   includes a first flat mirror section that includes the first outer lateral edge and a second flat mirror section that includes the second outer lateral edge, the two flat mirror sections meeting approximately at the center of the partial mirror.

2. The apparatus of claim 1, wherein the first and second flat minors are arranged at angle relative to each other, the angle being in a range of approximately 45°-90°.

3. The apparatus of claim 1, wherein the first and second flat minors are arranged at an angle of 45° relative to each other.

4. An apparatus comprising:
a ledge;
a connecting arm; and
a partial mirror coupled to the ledge via the connecting arm, wherein:
   the partial mirror:
      is partially transparent;
      includes a center, a first outer lateral edge, and a second outer lateral edge; and
      is structured and arranged relative to the ledge such that, if a component having a flat surface is laid against the ledge with the flat surface facing away from the ledge and spanning laterally from across the first outer lateral edge to across the second outer lateral edge, the flat surface faces the partial mirror and a center of the partial mirror is further from the flat surface than each of the first and second outer lateral edges, a part of the partial mirror that is adjacent the first outer lateral edge thereby reflecting a part of the flat surface that is opposite the second outer lateral edge, and a part of the partial mirror that is opposite the second outer lateral edge thereby reflecting a part of the flat surface that is opposite the first outer lateral edge; and
   the ledge is configured such that, if the component includes a flat bottom face and a flat back face that includes a lower edge and an upper edge and extends perpendicularly upward away from the flat bottom face from its lower edge towards its upper edge and the component is laid with its flat back face (a) against the ledge and (b) extending upwards from its bottom face at a lower region of the ledge to its upper edge at an upper region of the ledge, then the upper edge of the flat back face is positioned further from the partial mirror than the lower edge of the flat back surface.

5. The apparatus of claim 4, wherein the partial mirror curves from each of the first and second outer lateral edges away from the ledge and towards the center of the partial mirror.

6. The apparatus of claim 4, wherein the first and second flat minors are arranged at angle relative to each other, the angle being in a range of approximately 45°-90°.

7. The apparatus of claim 4, wherein the first and second flat minors are arranged at an angle of 45° relative to each other.

8. An apparatus comprising:
a device including a screen;
a ledge against which the device lays;
a connecting arm; and
a partial mirror that:
   is coupled to the ledge via the connecting arm;
   includes a center, a first outer lateral edge, and a second outer lateral edge;
   is structured and arranged relative to the ledge such that the screen faces the partial mirror and a center of the partial mirror is further from the screen than each of the first and second outer lateral edges, a part of the partial minor that is adjacent the first outer lateral edge thereby reflecting a part of the screen that is opposite the second outer lateral edge, and a part of the partial minor that is opposite the second outer lateral edge thereby reflecting a part of the screen that is opposite the first outer lateral edge;
   is partially transparent; and
   includes a first flat mirror section that includes the first outer lateral edge and a second flat mirror section that includes the second outer lateral edge, the two flat mirror sections meeting approximately at the center of the partial mirror.

9. The apparatus of claim 8, wherein the apparatus is structured such that, when the apparatus is laid on a flat surface, a top edge of the partial mirror is higher than a top edge of the device.

10. The apparatus of claim 9, wherein the flat surface is a vehicle dashboard.

11. The apparatus of claim 9, wherein the device is a mobile phone.

12. The apparatus of claim 8, wherein the first and second flat minors are arranged at angle relative to each other, the angle being in a range of approximately 45°-90°.

13. The apparatus of claim 8, wherein the first and second flat minors are arranged at an angle of 45° relative to each other.

14. An apparatus comprising:
a device that includes:
   a flat bottom face;
   a flat back face that includes a lower edge and an upper edge and extends perpendicularly upward away from the flat bottom face from its lower edge towards its upper edge; and
   a screen;
a ledge against which the device lays;
a connecting arm; and
a partial mirror coupled to the ledge via the connecting arm, wherein:
   the partial mirror:
      includes a center, a first outer lateral edge, and a second outer lateral edge;

is structured and arranged relative to the ledge such that the screen faces the partial mirror and a center of the partial mirror is further from the screen than each of the first and second outer lateral edges, a part of the partial minor that is adjacent the first outer lateral edge thereby reflecting a part of the screen that is opposite the second outer lateral edge, and a part of the partial minor that is opposite the second outer lateral edge thereby reflecting a part of the screen that is opposite the first outer lateral edge; and is partially transparent; and the ledge is configured such that, when the device is laid with its flat back face (a) against the ledge and (b) extending upwards from its bottom face at a lower region of the ledge to its upper edge at an upper region of the ledge, then the upper edge of the flat back face is positioned further from the partial mirror than the lower edge of the flat back surface.

15. The apparatus of claim 14, wherein the partial mirror curves from each of the first and second outer lateral edges away from the ledge and towards the center of the partial mirror.

16. The apparatus of claim 14, wherein the first and second flat minors are arranged at angle relative to each other, the angle being in a range of approximately 45°-90°.

17. The apparatus of claim 14, wherein the first and second flat minors are arranged at an angle of 45° relative to each other.

* * * * *